United States Patent
Bovington

(10) Patent No.: US 9,820,449 B1
(45) Date of Patent: Nov. 21, 2017

(54) SINGLE FILL POINT PLANT PROTECTOR WITH INTEGRAL VENT

(71) Applicant: Thomas P. Bovington, Helena, MT (US)

(72) Inventor: Thomas P. Bovington, Helena, MT (US)

( * ) Notice: Subject to any disclaimer, the term of this patent is extended or adjusted under 35 U.S.C. 154(b) by 395 days.

(21) Appl. No.: 14/709,005

(22) Filed: May 11, 2015

Related U.S. Application Data

(60) Provisional application No. 61/996,511, filed on May 9, 2014.

(51) Int. Cl.
*A01G 13/02* (2006.01)

(52) U.S. Cl.
CPC ................ *A01G 13/0243* (2013.01)

(58) Field of Classification Search
CPC .. A01G 13/0243; A01G 13/02; A01G 13/043; A01G 13/10; A01G 13/04; A01G 27/02; A01G 9/02; A01G 27/001
USPC .......... 47/20.1, 21.1, 23.1, 23.2, 23.3, 24.1, 47/29.1, 29.6, 29.7, 29.2, 30, 32.3, 32.4, 47/65.5, 66.1, 65.7, 65.8, 72, 48.5, 79, 47/81, 32.5
See application file for complete search history.

(56) References Cited

U.S. PATENT DOCUMENTS

| | | | |
|---|---|---|---|
| 2,028,060 A | 1/1936 | Gilbert | |
| 2,232,005 A * | 2/1941 | Jones | A01G 13/04 47/29.7 |
| 4,267,665 A | 5/1981 | Wallace et al. | |
| 4,821,453 A * | 4/1989 | Morehead | A01G 13/04 222/475 |
| 4,901,472 A * | 2/1990 | Donohue | A01G 13/0237 126/263.02 |
| 5,613,320 A | 3/1997 | Thomasson et al. | |
| 6,108,970 A | 8/2000 | Ball | |
| 6,282,835 B1 | 9/2001 | Richtsmeier | |
| 8,745,920 B1 * | 6/2014 | Mills | A01G 13/0243 47/29.6 |
| 2010/0071800 A1 | 3/2010 | Kohler et al. | |
| 2010/0299993 A1* | 12/2010 | Lais | A01G 13/0243 47/29.4 |
| 2011/0219681 A1 | 9/2011 | Stockwell | |
| 2011/0258923 A1* | 10/2011 | Lais | A01G 13/0243 47/32.6 |

OTHER PUBLICATIONS

EZ-WALLS Plant Protectors featured on www.theidealgardenstore.com.

* cited by examiner

*Primary Examiner* — Trinh Nguyen
(74) *Attorney, Agent, or Firm* — Jean Kyle

(57) ABSTRACT

A fill tube for a water filled plant protector is formed by folding the top edge of the outer wall of the protector between the inner and outer walls and capturing the edge with the welds that create the vertical columns. The protector is filled through a port in the tube. Air is vented as the columns fill with water through the open top of each column.

11 Claims, 7 Drawing Sheets

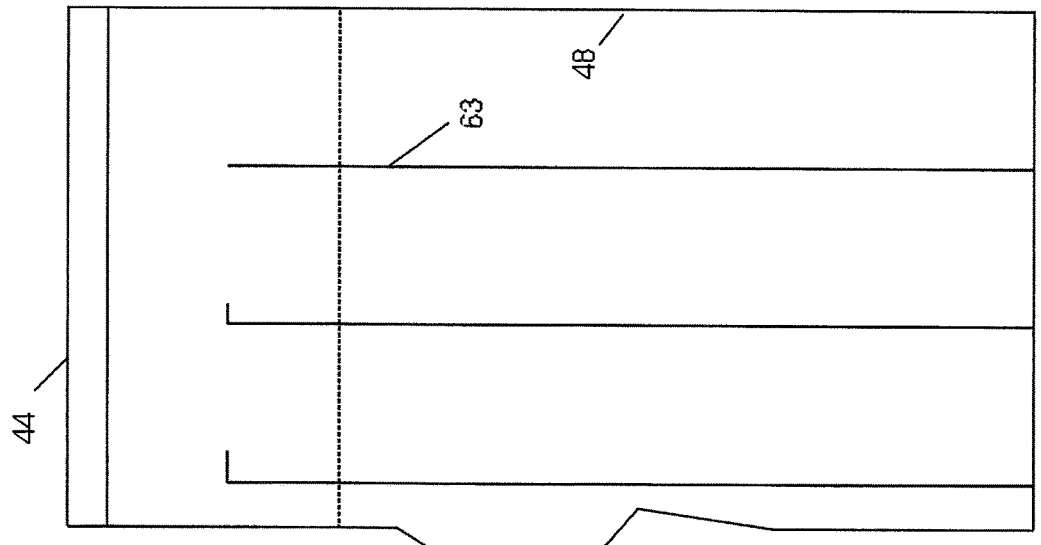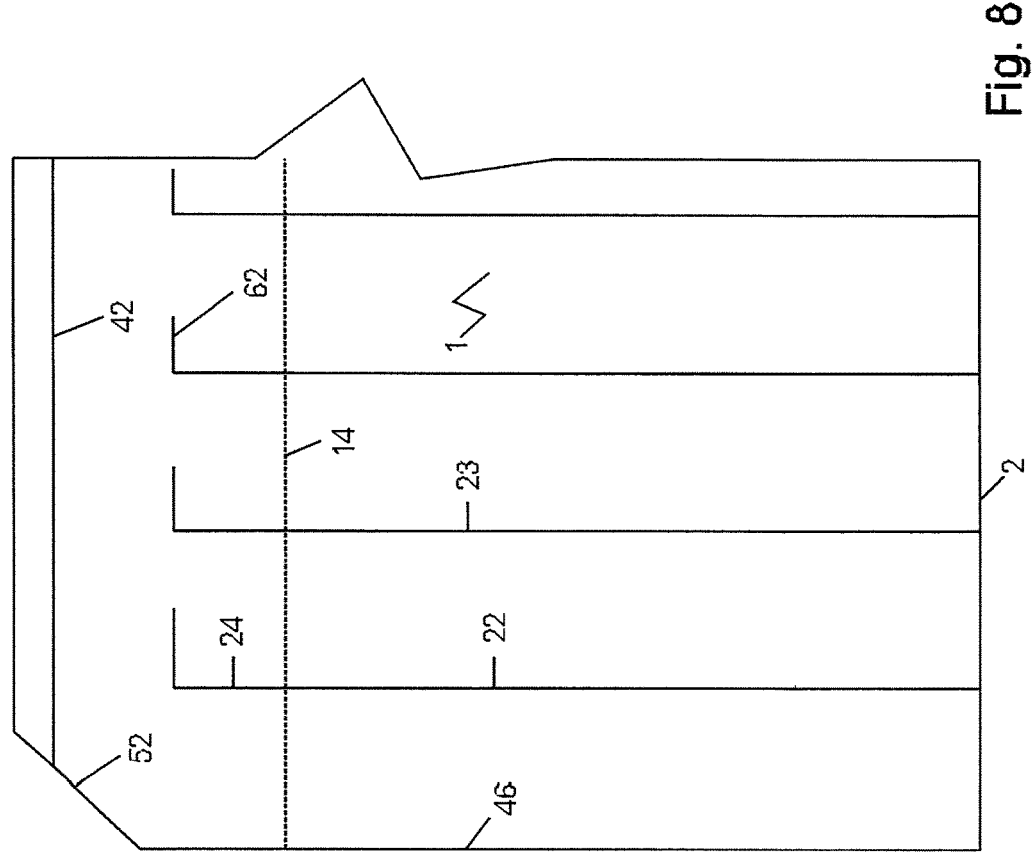
Fig. 8

SINGLE FILL POINT PLANT PROTECTOR WITH INTEGRAL VENT

CROSS-REFERENCE TO RELATED APPLICATIONS

This application claims the benefits of U.S. Provisional Application No. 61/996,511, filed May 9, 2014, the disclosure of which is hereby incorporated by reference in its entirety including all figures, tables and drawings.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

Field of the Invention

This invention relates to plant protectors that hold water, specifically protectors that are filled through a single point to charge a plurality of vertical columns with liquid.

Several types of welded water filled plant protectors have been proposed—for example, in U.S. Pat. No. 4,267,665 (Wallace et al.) and U.S. Pat. No. 6,282,835 B1 (Richtsmeier). The EZ-Walls product is a welded water filled plant protector and is currently also in production and it includes a filling system.

U.S. Pat. No. 4,267,665 (Wallace et al.) ('665) discloses a folded flexible device with a closed bottom and a plurality of vertical liquid columns that are filled individually from the top. The vertical liquid columns are created by welding fore and aft plastic pieces. The welds don't reach the top so once the filling device is between the two sheets of plastic it can move from column to column charging each column individually. The protector however is difficult to fill and it is recommended to put the protector around a five gallon bucket during filling so it is stabilized during the lengthy filling process. The columns must be filled with liquid independently because when liquid is simply poured in the top area there is not enough force for it to flow into each column. This creates a situation where the product is difficult to fill because each individual liquid column needs the hose actually to be inserted into the column to fill it. That operation takes excessive time and uses more liquid to fill because of overflow.

U.S. Pat. No. 6,282,835 B1 (Richtsmeier) discloses a product similar to the '665 patent but one which the vertical liquid columns are all interconnected on the bottom so the columns can all be filled from just one column. The problem with the design is that if one of the columns develops a leak the entire product will drain and be useless. Another problem with the design is that the entire product cannot be filled through just one column in practice. This problem puts into question whether the product is commercially viable.

The EZ-Walls product shows a version of the device shown in the '665 patent with the top welded shut and an opening in the top side to allow filling the product with liquid using a single filling location. One disadvantage of the product is the columns cannot be filled individually because the product gets filled from the one fill location so it is not possible to partially fill each tube to the same level because all liquid must travel across the previous column of liquid as it fills the next column. Another disadvantage is the columns cannot be easily adjusted after filling through the fill port to the same level of liquid between them let alone a certain overall level for all the columns together because of the single fill location is also the only drain location. Another disadvantage is the enclosure also accelerates the growth rate of mold and mildew because the columns cannot access flowing air and the liquid never fully evaporates during storage. Another disadvantage is that the columns cannot be individually cleaned out mechanically or chemically because they are not accessible. Another disadvantage is if a chemical cleaning agent is used to remove mold and mildew the residual agent left after drainage is less likely to evaporate fully during the off season and the plastic could prematurely age. Another disadvantage of the design is that it discharges out the fill port when you lower the column levels by squeezing the protector and it squirts the operator if the fill port is facing him because it is the only location the liquid can escape. Another disadvantage of this product is that the design removes the ability to fill the product using the '665 patent method thus if the welded top fill area fails the entire product is unusable unless the operator cuts open the top entirely so it performs as the device shown in the '665 patent.

U.S. Patent Application Publication No. US 2010/0071800 A1 discloses an apparatus that is used to simplify the filling of products similar to the device shown in the '665 patent by incorporating a rigid substantially cylindrical device with an inlet manifold for the fluid to come in and a plurality of outlet ports that are inserted into the top of the empty water columns for simultaneous filling. One disadvantage is the apparatus would need to be stored for extended periods of time and would take up large amounts of room. Another disadvantage is that should any of the outlet ports shear off the device would not fill those columns and, in effect, become useless. Another disadvantage is the device would also have to be designed to fit one manufacturer of plant protector and would force the consumer to always buy the same type or have multiple filling apparatus as described for the various different plant protectors chosen. It is a disadvantage to require two devices when the filling function can be accomplished with only one.

All of the aforementioned plant protectors are slow to fill or if they fill rapidly they either fully fail with one hole (leak) in column or lose the advantages of the original design plus are hard or impossible to clean. The plant protector filler described in US 2010/0071800 A1 must match a specific plant protector and be stored and protected from damage during most of its useful life. It also could become completely useless if one fill tube shears off.

There is a need for a rapidly filling plant protector that can be evenly filled from a single point to a chosen height that can also be easily emptied. Further there is a need for a single point filling device that will function if a liquid column has a puncture. There is a need for a device that can be cleaned and fully dried when not in use. Further there is a need for a device that has an integral single point filling device incorporated into it that retains the advantages of the device shown in the '665 patent.

All patents, patent applications, provisional patent applications and publications referred to or cited herein, are incorporated by reference in their entirety to the extent they are not inconsistent with the teachings of the specification.

BRIEF SUMMARY OF THE INVENTION

In accordance with one embodiment a flexible plant protector comprising of vertical columns created from welding the front and back parts of a single folded piece of plastic from the bottom fold and to a distance from the top after capturing and welding part of the upper part of one of the plastic sheets that is folded inward between the two outer sheets to produce an enclosed area, a fill tube, that when pressurized with liquid will transport the liquid to all the vertical columns through the plurality of the spaces at the top of the vertical columns.

Various types of devices may be used which fall within the scope of the invention. The preferred embodiment is best described in the following way. Plant protectors and their various advantages are well known in the art. Heretofore, however, each of those plant protectors are lacking. Therefore, it is an object of the invention to provide a plant protector that has a fast, single point, easy filling design. It is also an object of the invention to provide a plant protector that has a design with a natural check valve that, when combined with a top filling port and tightening string, doesn't squirt the user when tightened. It is an object of the invention to provide a plant protector that has a fast, easy filling design that is also quick emptying and cleanable with a brush or a chemical. It is an object of the invention to provide a plant protector that can be filled with an integral filling ring thus not wasting time and resources with a separate unit used as the filling device. It is also an object of the invention to provide a plant protector that has holes around the perimeter for a tightening rope. It is an object of the invention to provide a plant protector that has a design where one wall is higher than the wall with the fill tube so the hose can fill with easier placement when filling without the fill tube. It is an object of the invention to provide a plant protector that has variable opening size of the vertical columns created by decreasing offsets on the tops of the column welds so the vertical columns are filled evenly from back to front of the unit when charging with the fill ring. It is also an object of the invention to provide a plant protector that has a welded point between two columns that have fluid connectivity at the bottom and thus allowing the bottom of the unit to angle out for added stability. The two columns fluid connectivity is created when one column weld doesn't reach the bottom, so half the columns fill from the bottom and if one puncture is created, the whole unit doesn't empty. It is an object of the invention to provide a plant protector with angled frustrom shaped columns for more efficient filling and more pronounced stability. It is an object of the invention to provide a plant protector that has a fast filling design where one can lower the level of the columns individually without having to pass the water over the adjacent columns left or right and without moving water only in the outward direction when selectively lowering the water level. It is also an object of the invention to provide a plant protector that has a fast filling design with an injection port that is quick to use and easy to fill to the correct height. It is an object of the invention to provide a plant protector that has a definitively emptying design that is cleanable with a light brush, and in conjunction with a chemical, if desired, and can restore the plant protectors to like new so it will nicely dry in the off season and the moisture and dirt will not contribute to the degradation process. It is also an object of the invention to provide a plant protector in which the filling port is above the bottom of the fill tube, which allows the plant protector to be filled higher so the design can be shorter and use less plastic.

BRIEF DESCRIPTION OF THE SEVERAL VIEWS OF THE DRAWING

FIG. 6 is a cross sectional view through a column of another preferred embodiment of the invention with an independent fill tube.

FIG. 8 is a plan view of another preferred embodiment of the invention with an angular fill port and column welds offset for even filling of the columns.

DETAILED DESCRIPTION OF THE INVENTION

Figure 1:
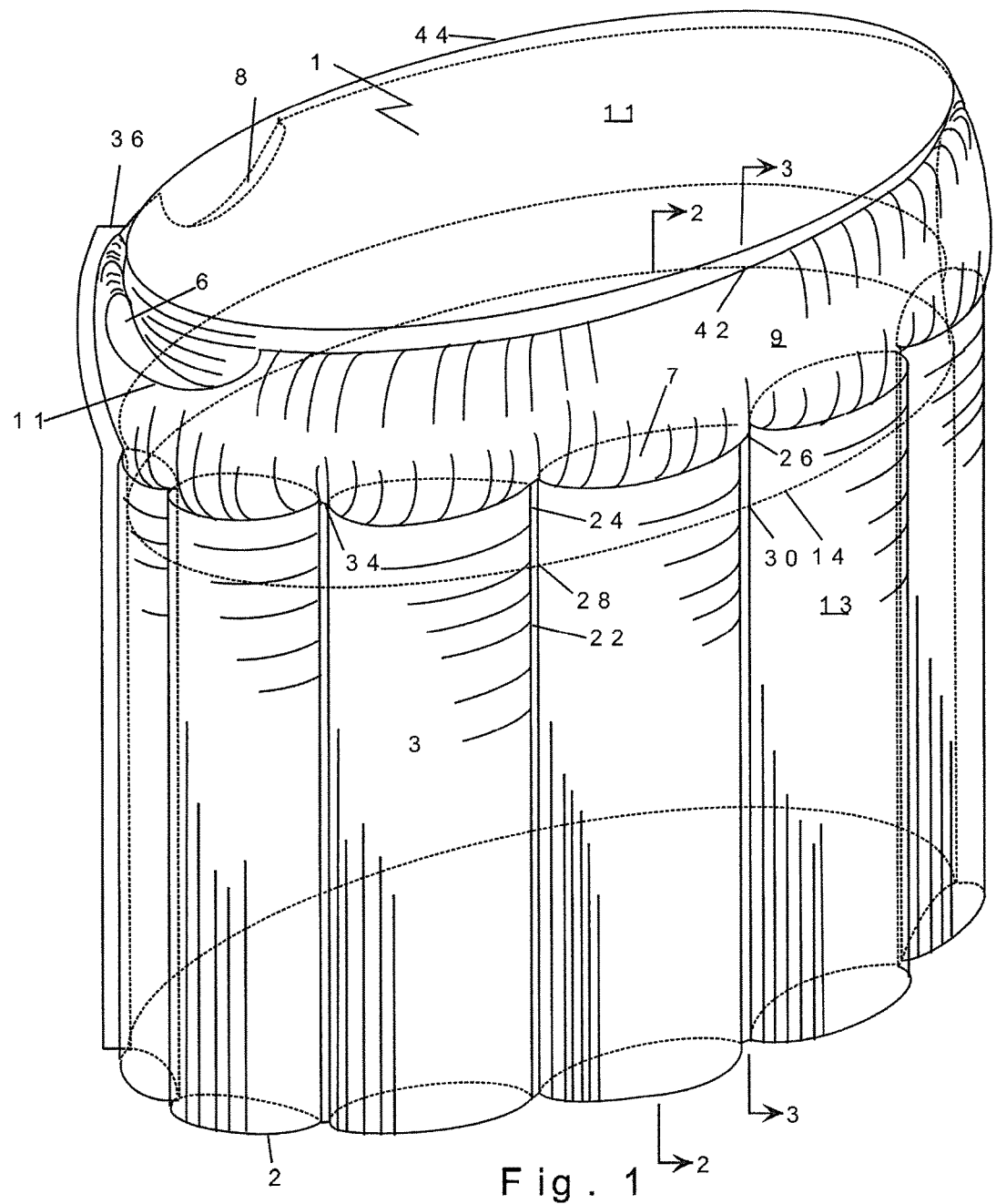
FIG. 1 is a perspective view of a preferred embodiment of the plant protector of the subject invention.

A preferred embodiment of the instant device is shown in FIGS. 1-5, and described below. FIG. 1 is a perspective view of the plant protector 1 shown full of liquid above the top of the vertical column 3 and into fill tube 9. The fill tube 9 receives its liquid from a hose put in the fill port 6 and the liquid flows through the fill tube 9 under pressure and flows into the vertical columns 3.

Figure 2:
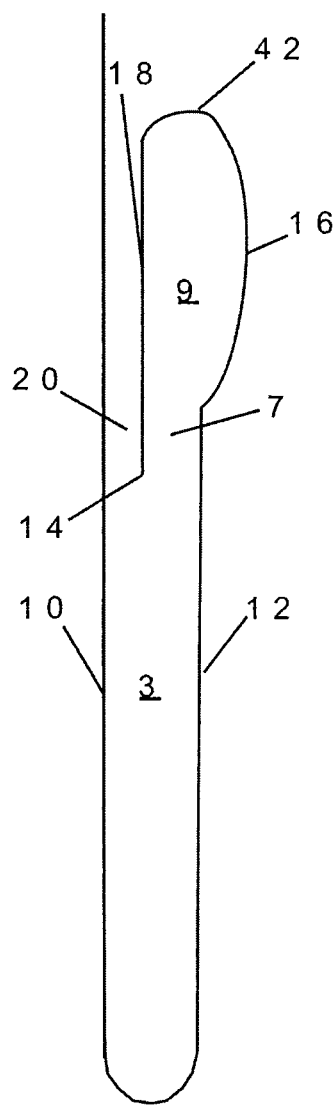
FIG. 2 is a cross sectional view at 2-2 of FIG. 1 showing the column and fill tube filled with water.

FIG. 2 is a cross sectional view of the plant protector 1 at 2-2 of FIG. 1 which shows the vertical liquid column 3 full of liquid that is between the inner wall 10 and the outer wall 12 and above the plant protector bottom 2. The fill tube 9 shown is created when the outer wall top 14 is folded inward between the inner wall 10 and the outer wall 12 to the point of where the outer wall top 14 is placed into the upper section of the vertical liquid column 3. Liquid passes from the fill tube 9 to the vertical liquid column 3 fill channel 7 which is between the outer wall 12 and the inner fill tube wall 18. As the vertical column 3 fills with liquid, air is released through the column vent port 20 which is between the inner wall 10 and the inner fill tube wall 18. The inner wall top 44 is above the uppermost portion of the fill tube 9.

Figure 3:
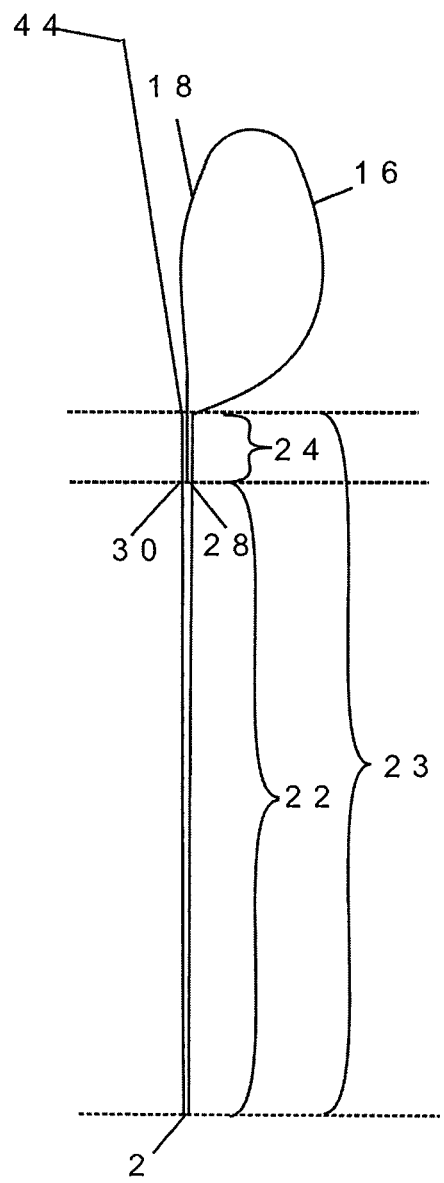
FIG. 3 is a cross sectional view at 3-3 of FIG. 1 showing the fill tube filled with water.

FIG. 3 is a cross sectional view of the plant protector 1 at 3-3 of FIG. 1 that shows the welded portion of the plant protector 1 that creates the vertical columns 3 and defines the fill tube 9. The outer wall top 14 curves inward and enters into the top of the vertical column 3 to the point of the triple wall weld bottom 28 which coincides and is above the double wall weld top 30. The double wall weld 22 is created when the inner wall 10 and the outer wall 12 are welded together from the plant protector bottom 2 to the triple weld bottom 28 or double wall top 30. The triple wall weld 24 is created when the outer wall top 14 and a portion of the outer wall 12 is placed between the inner wall 10 and the outer wall 12 and then welded together. The column weld 23 is the summation of the double wall weld 22 and the triple wall weld 24. The fill tube 9 is made up of the inner fill tube wall 18 and the outer fill tube wall 16. The top of the triple wall weld 26 defines the fill tube bottom 34.

Figure 5:
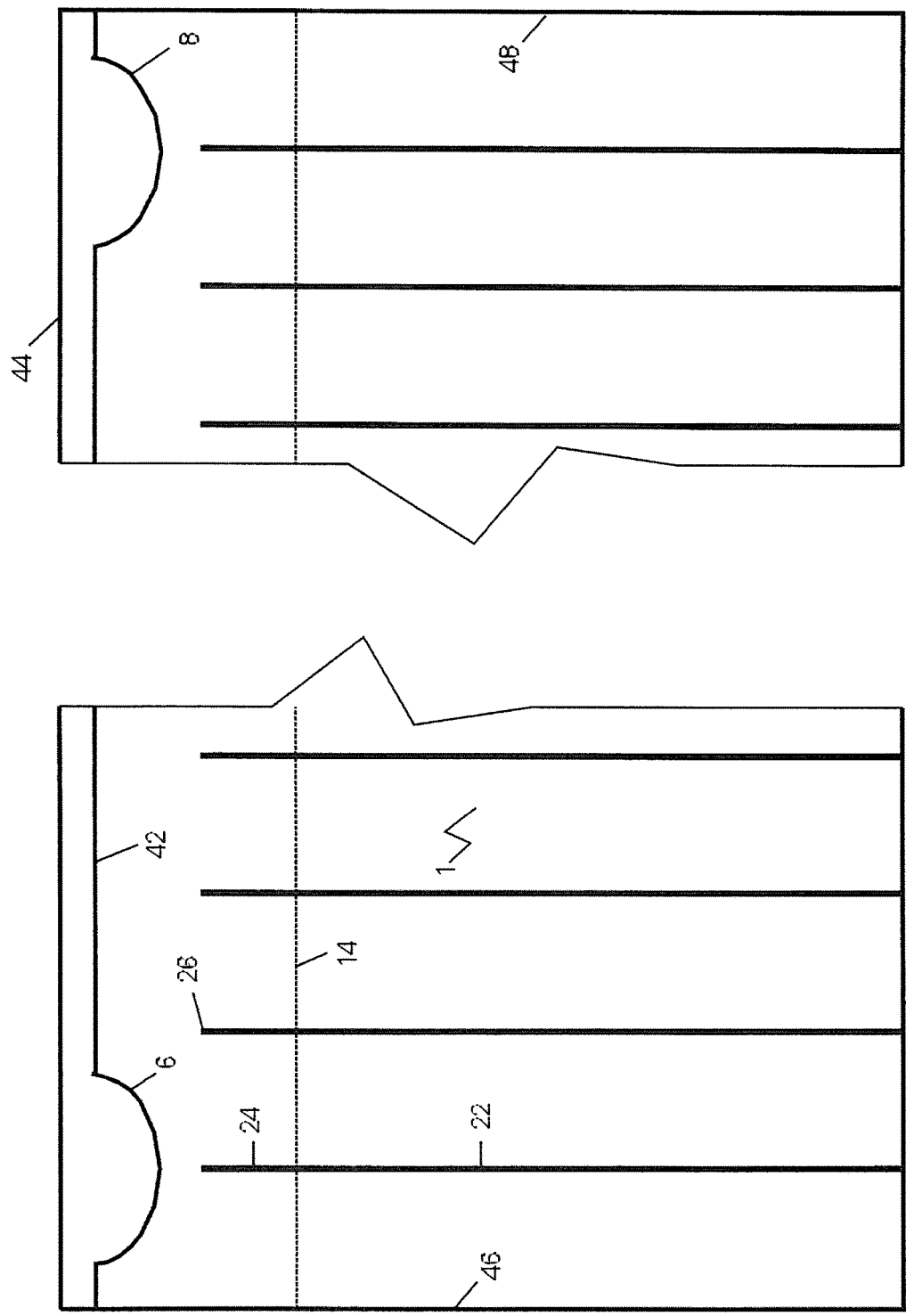
FIG. 5 is a plan view of the embodiment shown in FIG. 1 before the final assembly into the cylindrical shape that surrounds the plant.

FIG. 5 best describes the plant protector 1 production method before it is made into a cylinder with cylinder weld 36 shown in FIG. 1. FIG. 5 shows the plan view of the plant protector 1 before the final cylinder weld 36 completes the product. The double wall weld 22 is shown beginning at the plant protector bottom 2 and continues until the outer wall top 14 where the continuous weld becomes the triple wall weld 24 until it ends at the triple weld top 26. The outer wall upper fold 42 creates the top of the fill tube 9 and has both the fill port 6 and the optional second fill port 8 cut out. FIG. 5 shows that both the double wall weld 22 and the triple wall weld 24 are continuous and that a plurality of them parallel to each other create the vertical liquid columns 3. During production the far left side 46 and the far right side 48 can be non-welded because they will be sealed once the cylindrical weld 36 is performed to complete the plant protector 1.

Figure 4:
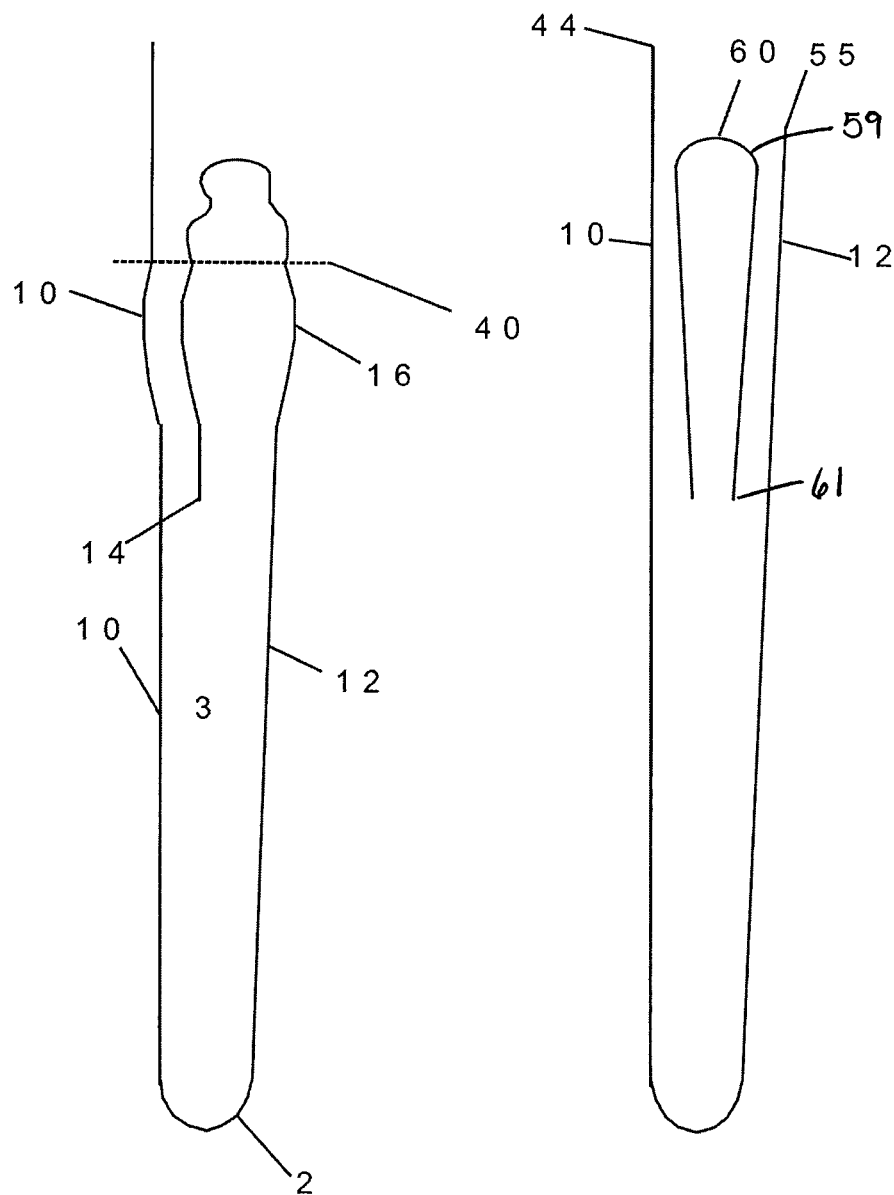
FIG. 4 is a cross sectional view of the preferred embodiment shown in FIG. 2 but the invention is operational so the static water level is not to the top of the fill tube.

The operational water level of the plant protector 1 is best described in FIG. 4 which shows a cross sectional view at 2-2 of FIG. 1 when the plant protector 1 is not completely full of liquid. In this view the liquid level 40 in the plant protector 1 is only part way into the fill tube 9. With the plant protector 1 only filled to a partial liquid level 40 the material of the inner fill tube wall 18 and the outer fill tube wall 16 and the inner wall 10 are only under hydrostatic stress to the point of the liquid level 40. If the fill port 6 is created as shown in FIG. 5 by cutting it out of the top of the fill tube 9 then the liquid level 40 can never be above the bottom of the fill port 11 during operation. If the fill port 6 is above the top of the fill tube 9 then the fill tube 9 can be full during operation.

Figure 7:
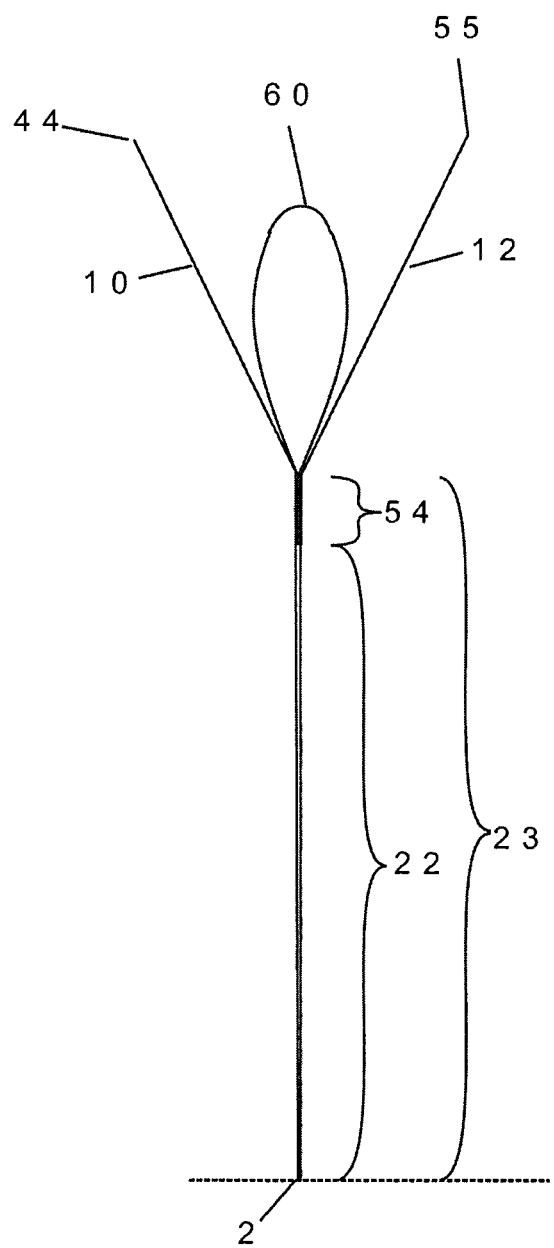
FIG. 7 is a cross sectional view along the weld of the embodiment shown in FIG. 6 with the fill tube full of water.

FIG. 6 is a cross sectional view of another preferred embodiment of the plant protector 1 at a point similar to 2-2 of FIG. 1 where there is an independent fill tube 60 made from an additional piece of material that is not created from the outer wall 12. The independent fill tube 60 can have a folded edge 59 opposite two free edges 61. FIG. 6 also shows that with an independent fill tube 60 the plant protector 1 has an inner wall top 44 and an outer wall top 55. FIG. 7 shows the same construction method with a view similar to 3-3 of FIG. 1. FIG. 7 shows that in this embodiment the column weld 23 now becomes the summation of the double wall weld 22 and the quadruple wall weld 54.

Another preferred embodiment of the plant protector of the subject invention is shown in FIG. 8 where the plant protector 1 has an angular fill port 52 for ease of manufacturing and use. FIG. 8 also shows that each column weld 23 except for the furthest column weld 63 from the angular fill port 52 have a column weld offset 62 that is ever reducing in length when moving inward to control the column fill rate so each vertical liquid column 3 fills at an even rate. If the plant protector has an additional fill port 52 the column weld offset 62 of each column weld 23 can be ever reducing as each column weld 23 is farther away from the each fill port 52 until the column weld 23 equidistant from each fill port 52 is reached and it will not have a column weld offset 62.

Figure 9:
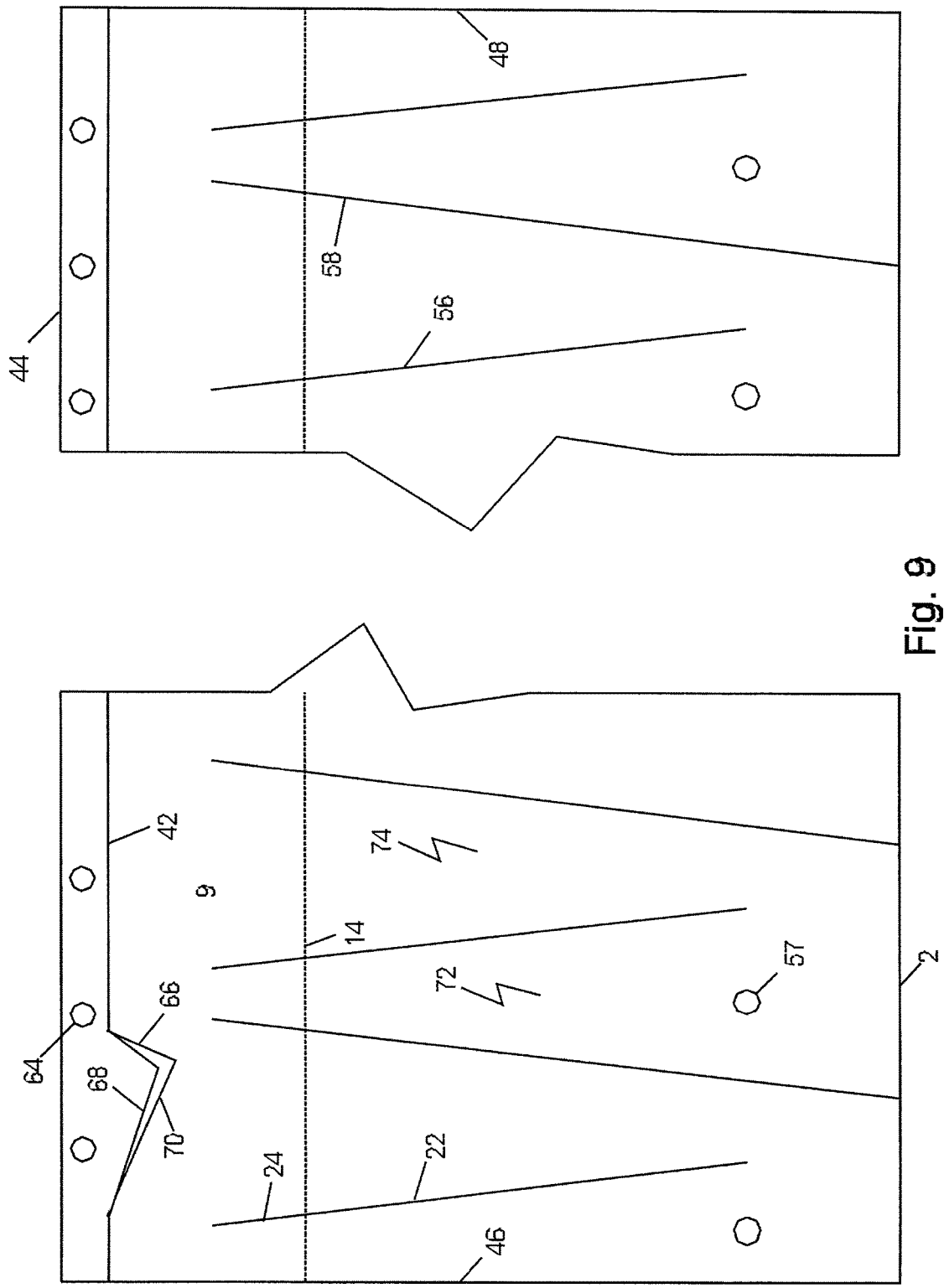
FIG. 9 is a plan view of another preferred embodiment of the invention with a staggered fill port, angular column welds, and spot welds for increased stability during use.

A further preferred embodiment is shown in the FIG. 9 which is a plan view showing a plant protector 1 having short angular column welds 56 and long angular column weld 58 with a spot weld 57 between them. Both the short angular column weld 56 and long angular column weld 58 stop the same distance into the triple wall weld 24 to define the size of the fill tube 9 but the long angular column weld 58 is continuous in the double wall weld 22 area until it reaches the plant protector bottom 2 while the short angular column weld 56 stops a distance before the plant protector bottom 2 to create a continuous volume of liquid between the short angular liquid column 72 and the long angular liquid column 74. The distance between both the top of the short angular column weld 56 and the top of the long angular column weld 58 in the long angular liquid column 74 area is larger than the distance between both the top of the short angular column weld 56 and the top of the long angular column weld 58 in the short angular liquid column 72 area so the liquid flowing in the fill tube 9 will more readily flow into the long angular liquid column 74 and flow from below into the short angular liquid column 72. The same distance down the double wall weld 22 of the short angular column weld 56 there is a spot weld 57 that is equal distance from the bottom of the short angular column weld 56 as the short angular column weld 56 is from the same lateral position of the long angular column weld 58. This spot weld 57 and short angular column weld 56 bottom allow the plant protector bottom 2 to flare outward and create a more stable structure. FIG. 9 also shows the inner wall 10 with holes for rope 64 to tighten the plant protector 1 into a cone. FIG. 9 also shows the fill tube 9 with an offset fill port 66 cut into it through the outer wall upper fold 42 area created out of the outer wall 12 when it is folded. The offset fill port 66 is cut at an angle with the offset fill port high side 68 on the inner fill tube wall 18 and the offset fill port low side 70 on the outer fill tube wall 16 so it is easier to insert the hose when filling.

Although it is expected that construction of the present invention will use current materials and techniques for making water filled plant protectors, applicant notes that new or alternative materials and methods to create the subject device are anticipated. For example, the subject invention is described made of a single plastic sheet folded and welded by known plastic welding techniques. The subject device can be constructed of several sheets of plastic welded together. Plastic types and thicknesses can vary. Plastics used to construct the subject device could include fiber reinforcement. In some situations, welds can be created by glue. Other examples of varied materials and methods include, but are not limited to, using a nylon fabric treated for water resistance to construct the device in which sewing and water-proofing seams may be applicable to the method of creating the subject device. Fluids other than water may work more effectively in the subject device but could require different materials to contain the fluids. While a number of variations of the material and methods to make the claimed invention can be anticipated, it is noted that it is the invention's unique configuration that creates a fill tube with integral vents that imparts the many advantages to the device.

Accordingly, besides the objects and advantages of the fast filling plant protector described herein, several objects and advantages of the present invention are:

a) Design allows access to all the columns for cleaning.

b) Design can be filled rapidly and easily without using an upside down bucket to hold the plant protector during filling because the single point filling system charges the individual columns rapidly.

c) If one column gets a puncture the entire plant protector doesn't fail.

d) When lowering the water level the liquid flows out of each column independently.

e) Plant protector can easily be dried out for storage like the device described in the '665 patent but has the advantage of the single point fast fill design.

f) Embodiments of the invention have the advantages of more stability while not having all the columns interconnected so a puncture doesn't make the product unusable.

g) Water can be dumped out of the columns individually and completely.

h) A tie strap can be used to hold the product in a cone without putting the strap in the fill tube. Having the strap in the fill tube can cause a premature failure of the filling device which is unrelated to the cone effect desired.

i) If operator doesn't want to use the single point filling device, or if it fails, then they can use the original method for filling the vertical columns.

j) Standard manufacturing process is easily incorporated into this design so that it will be easy to produce and operators will be able to use just like the original design.

k) Operator can push water out of each column independently even though design has a fast fill injection tube.

l) The design allows the water level to be easily altered as needed due to plant growth or weather by altering individual columns or all columns together.

The single point fast filling plant protector with integral vent can be used protect plants from the elements and keep them warm at night even during frost events while being able to be filled rapidly without the use of an upside down bucket to hold the plant protector during filling. In addition the design can be completely emptied and will rapidly dry in storage plus the columns can be chemically and mechanically cleaned if need be. Also the design has the single point filling feature that fills all the columns from the top so it will still function normally should several of the columns develop leaks. Additionally, since all the columns are independently vented, the level of the columns can easily be brought to whatever designated height the operator desires by squeezing the liquid out and the columns can be filled individually without the use of the injection ring by inserting the hose into the top of the chosen column. Plus the design allows for different heights of the two tops of the plastic walls so it is easier to insert the hose into the individual columns for filling. With the angular column shape with the spot weld between at the low point allows for more stability after filling than the standard designs with the added advantage that should a leak be created the entire product does not drain as other designs will. Importantly, once the product is filled and some of the water is to be emptied out so the conical shape can be created the excess water spills out the integral vent instead of onto the operator. The design also allows for even liquid levels in the columns since the liquid is independently discharged out the top of the column instead of having to be run past all the adjacent columns on its way to the fill port. Once the season is over the design can be completely emptied such that complete evaporation will occur plus should cleaning be desired there is easy access to the columns.

It is understood that the foregoing examples are merely illustrative of the present invention. Certain modifications of the articles and/or methods may be made and still achieve the objectives of the invention.

The invention claimed is:

1. A plant protector configured to surround a plant and be filled with a fluid, the plant protector comprising:
    an inner wall having a top and a bottom;
    an opposing outer wall having a top and a bottom, the bottom of the inner wall and the bottom of the outer wall connected, and a portion of the top of at least one of the outer wall and the inner wall folded inward and disposed between the inner wall and the outer wall;
    a plurality of welds spaced vertically between the top and bottom of each wall connecting the inner wall to the outer wall and creating near vertical columns, the welds capturing the top of the folded wall to create a fill tube; and
    at least one opening in the fill tube;
    wherein fluid poured into the at least one opening in the fill tube fill the near vertical columns and the plant protector is configured to surround the plant as a wall of fluid filled columns.

2. The plant protector of claim 1, wherein a portion of the top of said outer wall is folded inward and disposed between the inner wall and the outer wall, is captured by said welds and creates said fill tube.

3. The plant protector of claim 1, wherein said inner wall and said outer wall are as one piece and said bottom of said inner wall and said bottom of said outer wall are created by a fold.

4. The plant protector of claim 1, wherein each of said plurality of welds extend from said bottom of said inner wall and said bottom of said outer wall to near said top of said inner wall.

5. The plant protector of claim 1, wherein at least some of said plurality of welds bend orthogonally at an end of the weld disposed near said top of said inner wall.

6. The plant protector of claim 1, wherein said plurality of welds are angled from vertical and alternate between a first weld and a second weld wherein the first weld is at an angle less than vertical and extends from said bottom of said inner wall and said bottom of said outer wall to a point near said top of said inner wall and is adjacent to said second weld which is at an angle greater than vertical that extends away from said bottom of said inner wall and said bottom of said outer wall to the point near said top of said inner wall.

7. The plant protector of claim 6, further comprising spot welds away from said bottom of said inner wall and said bottom of said outer wall and between said first weld and said adjacent second weld.

8. The plant protector of claim 1, wherein said at least one opening in said fill tube is on a top of said fill tube.

9. The plant protector of claim 1, wherein said fill tube has a top, an outer wall, and an inner wall and said at least one opening in said fill tube is cut to have a side on the inner wall that is higher and closer to the top than a side on the outer wall.

10. The plant protector of claim 1, further comprising holes near said top of said inner wall in which to string a rope.

11. A plant protector configured to surround a plant and be filled with a fluid, the plant protector comprising:
    an inner wall and an outer wall formed by folding a single sheet, the inner wall having a top and a bottom, the outer wall having a top and a bottom, a portion of the top of the outer wall folded inward and disposed between the inner wall and the outer wall;
    a plurality of welds spaced vertically extending from the bottom of the inner wall near the top of the inner wall connecting the inner wall to the outer wall and creating near vertical columns, the welds capturing the top of the folded outer wall to create a fill tube; and
    at least one opening in a top of the fill tube;

wherein fluid poured into the at least one opening in the fill tube fill the near vertical columns and the plant protector is configured to surround the plant as a wall of fluid filled columns.

\* \* \* \* \*